United States Patent
Hoogenberg

[11] Patent Number: 6,117,044
[45] Date of Patent: Sep. 12, 2000

[54] INFINITELY VARIABLE FRICTION TRANSMISSION

[76] Inventor: Heerke Hoogenberg, Groenling 11, Rijssen, Netherlands, NL-7463 BH

[21] Appl. No.: 09/101,820

[22] PCT Filed: Nov. 19, 1997

[86] PCT No.: PCT/NL97/00632

§ 371 Date: Dec. 1, 1998

§ 102(e) Date: Dec. 1, 1998

[87] PCT Pub. No.: WO98/22729

PCT Pub. Date: May 28, 1998

[30] Foreign Application Priority Data

Nov. 21, 1996 [NL] Netherlands ............... 1004589

[51] Int. Cl.[7] ................................... F16H 15/54
[52] U.S. Cl. .................. 476/52; 475/166; 474/139
[58] Field of Search ............... 474/139; 476/47, 476/50, 52, 53; 475/165, 166, 167, 169, 170

[56] References Cited

U.S. PATENT DOCUMENTS

| | | | |
|---|---|---|---|
| 1,574,620 | 2/1926 | Hill | 476/63 X |
| 2,024,459 | 12/1935 | Lee | 476/72 X |
| 2,686,432 | 8/1954 | Bergmann | 74/640 |
| 2,687,650 | 8/1954 | Renaud | 474/112 X |
| 3,082,634 | 3/1963 | Battistin | 476/49 X |
| 3,324,746 | 6/1967 | Kari | 475/166 |
| 4,924,730 | 5/1990 | Parsons | 475/170 X |
| 4,995,279 | 2/1991 | Parsons | 475/166 |
| 5,601,507 | 2/1997 | Hoogenberg | 475/165 |

Primary Examiner—Rodney H. Bonck
Assistant Examiner—Ankur Parekh
Attorney, Agent, or Firm—Evenson, McKeown, Edwards & Lenahan, P.L.L.C.

[57] ABSTRACT

The invention relates to a mechanical transmission, which transmission includes guide members for realizing a rotational translating movement of a wheel which is connected to an output shaft and which makes contact with an endless belt of mutually abutting push links, which guide members are assembled from at least two linear guide tracks received mutually perpendicularly in the same plate and guide elements co-acting with the linear guide tracks, wherein guide elements are connected to the wheel for rotational translation and guide elements are rigidly connected to the frame whereby the plate is movable in linear manner relative to the frame and the wheel is displaceable in linear manner relative to the plate.

8 Claims, 6 Drawing Sheets

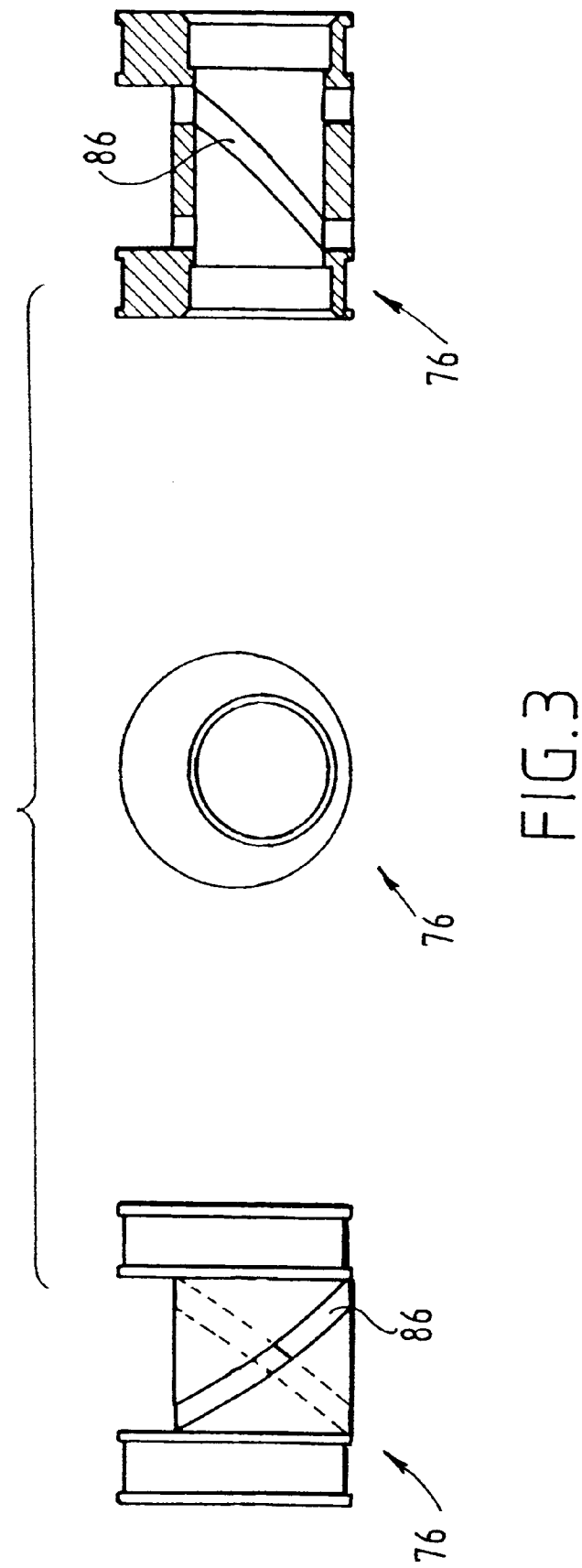

INFINITELY VARIABLE FRICTION TRANSMISSION

BACKGROUND AND SUMMARY OF THE INVENTION

The invention relates to a mechanical transmission comprising a frame, a first shaft which is rotatably connected to the frame and to which is fixed a pair of friction wheels placed at a mutual distance, a second shaft which is connected to the frame for rotation parallel to the first shaft and which carries a wheel which co-acts with an annular element comprising a circular contact surface located axially between the friction wheels of the first shaft, wherein the friction wheels comprise mutually converging friction surfaces.

Such a mechanical transmission is described in European patent application no. EP 94.910064.8 in the name of the same applicant as for the present invention.

The present invention has for its object to provide improvements and additions to a construction of the type described above. The invention provides for this purpose a transmission wherein the transmission comprises guide means for realizing a rotational translating movement of the wheel which is connected to the second shaft, which guide means are assembled from at least two linear guide tracks received mutually perpendicularly in a plate and guide elements co-acting with the linear guide tracks, wherein guide elements are connected to the wheel for rotational translation and guide elements are rigidly connected to the frame whereby the plate is movable in linear manner relative to the frame and the wheel is displaceable in linear manner relative to the plate.

It is known to use a planetary or differential system, such as for instance a plurality of planetary wheels for driving by a sun wheel and having an eccentric cam fixed to the wheel for rotational translation. A rotational translating movement is understood to mean a rotating movement of the wheel round an axis lying perpendicularly of the wheel and intersecting a plane through the wheel at a distance from the centre of the wheel. The wheel herein does not rotate relative to the centre of the wheel, i.e. the orientation of the wheel does not change during the rotational translating movement. The invention provides a transmission which can be manufactured much more advantageously.

The present invention also provides a mechanical transmission wherein the transmission comprises adjusting means for adjusting the eccentricity of the wheel connected to the second shaft relative to the first shaft, which adjusting means are formed by a rotatable and fixable eccentric. Such an eccentric which is simple to adjust enables variation in simple manner of the transmission ratio in a range which in principle is infinite, wherein it is also possible to cause the first shaft to stand still or to rotate in a direction opposed to that of the second shaft.

The invention moreover provides a mechanical transmission wherein the friction wheels are supported externally by nuts, which nuts are provided with contact surfaces which co-act with contra-contact surfaces arranged close to the external edge of the friction wheels. The contact surfaces and contra-contact surfaces preferably form parts of a helix. Even more preferably the nuts are placed under a bias in a direction toward each other, whereby the annular element can be clamped with a predetermined force between the friction wheels, whereby as the couple increases the pressure between the annular element and the friction wheels increases. In other words: the pressure with which the annular element is clamped between the friction wheels depends on the applied couple. Supporting of the friction wheels close to the outer end has the advantage that the converging form of the mutually facing sides of the friction wheels will not change when extremely great forces are exerted on the friction wheels.

Finally, the present invention provides a mechanical transmission wherein the wheel makes internal contact with the annular element, whereby a radially inward facing surface forms a surface for coaction with the wheel. Using this "mirror-symmetrical" construction a very compact transmission can be realized which can for instance be built into a hub. Particularly envisaged herein are the hubs of cycles, but many other applications are of course also conceivable.

Other objects, advantages and novel features of the present invention will become apparent from the following detailed description of the invention when considered in conjunction with the accompanying drawings.

BRIEF DESCRIPTION OF THE DRAWINGS

FIG. 3 shows three views of an adjusting bush which forms part of the adjusting means for adjusting the eccentricity of the second shaft.

DETAILED DESCRIPTION OF THE PREFERRED EMBODIMENTS

Figure 2:
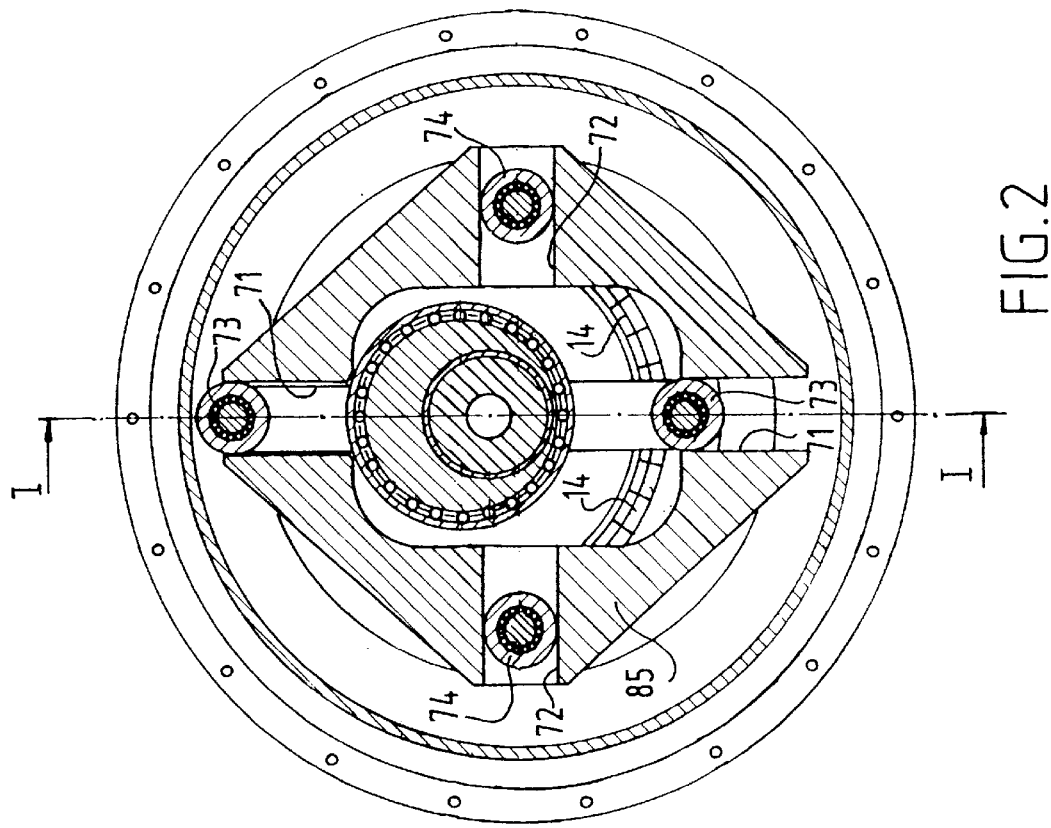
FIG. 2 shows a cross-section along the line II—II of the transmission shown in FIG. 1.
Figure 1:
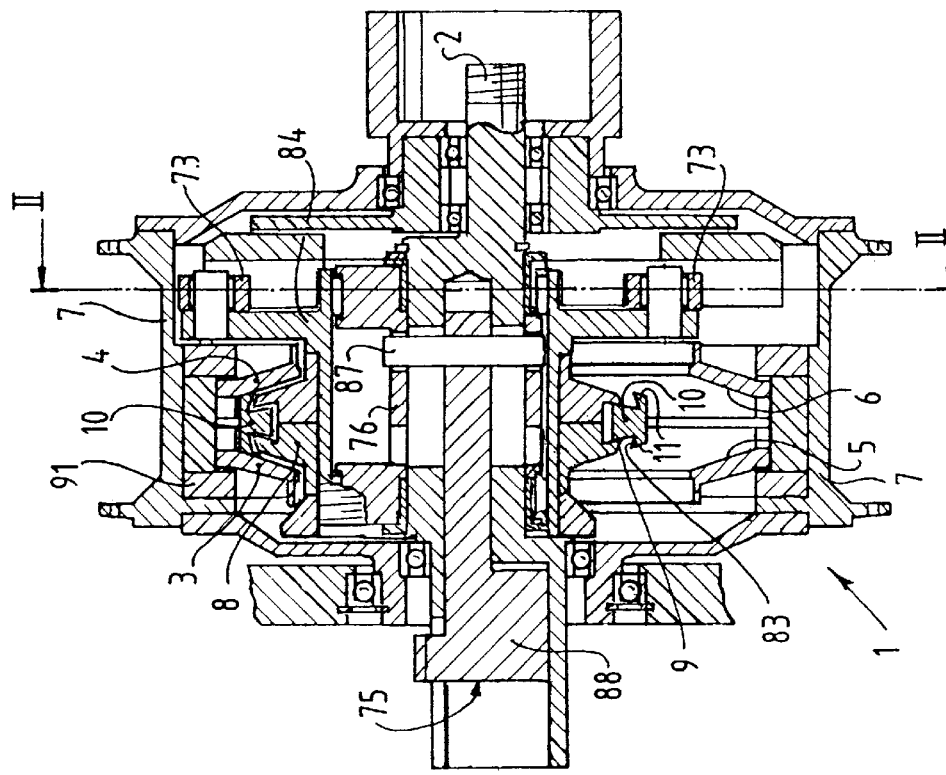
FIG. 1 shows a cross-section of a compactly embodied transmission according to the invention.

FIG. 1 shows a mechanical transmission 1 in which a first rotatable shaft 7, being the output shaft, is coupled to a pair of friction wheels 3,4. The output shaft 7 of mechanical transmission 1 is formed by the drum or hub 7. Mechanical transmission 1 thus takes a very compact form. Placed between friction wheels 3,4 is a fixed friction wheel 8 which on the inside engages on an endless belt 10 built up of separate links 14. These links 14 are only under strain of pressure whereby a mutual connection of links 14 is unnecessary. The side surfaces 11 of endless belt 10 co-act with the contact side 5,6 of friction wheels 3,4. A bearing bush 84 is connected to wheel 8. In order to effect a rotational translating movement of wheel 8, the bearing bush 84 is provided with guide elements 73, in this figure cam rollers, which co-act with linear guides 71 as shown in FIG. 2. In a plate 85 in which are arranged linear guides 71, linear guides 72 are also arranged perpendicularly of the first guides 71. Linear guides 71,72 both also lie perpendicular to a second shaft 2 being the input shaft and carrying the wheel 8. Plate 85 is linearly displaceable along the stationary cam rollers 74 in that these latter are movable in the linear guide 72.

Figure 4:
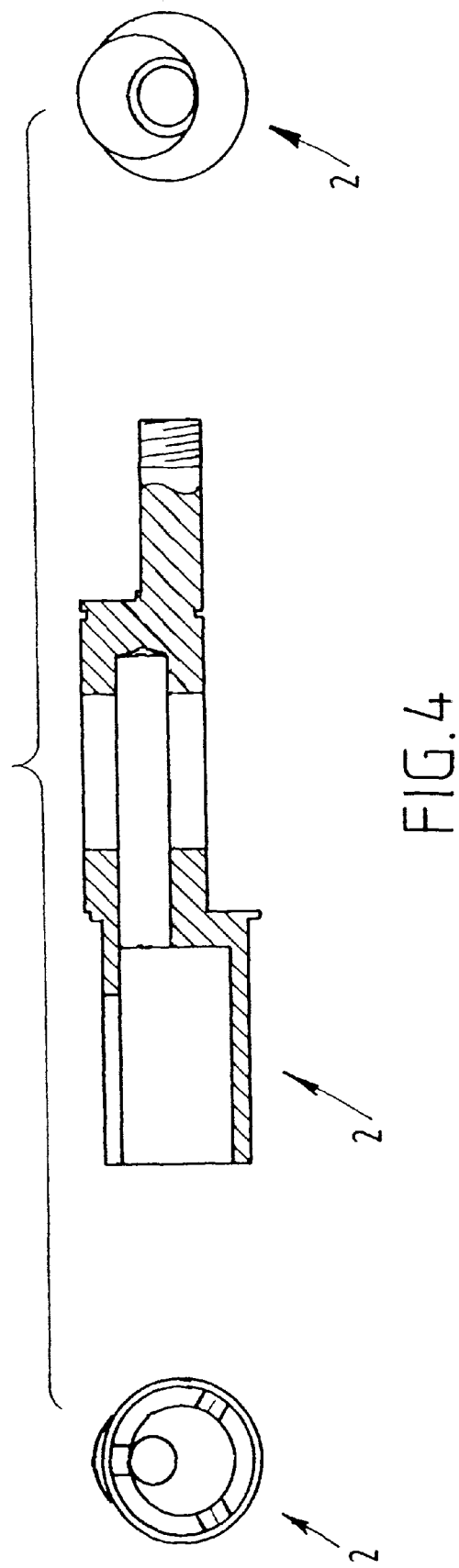
FIG. 4 shows three views of an adjusting pin for receiving in the adjusting bush of FIG. 3.
Figure 5:
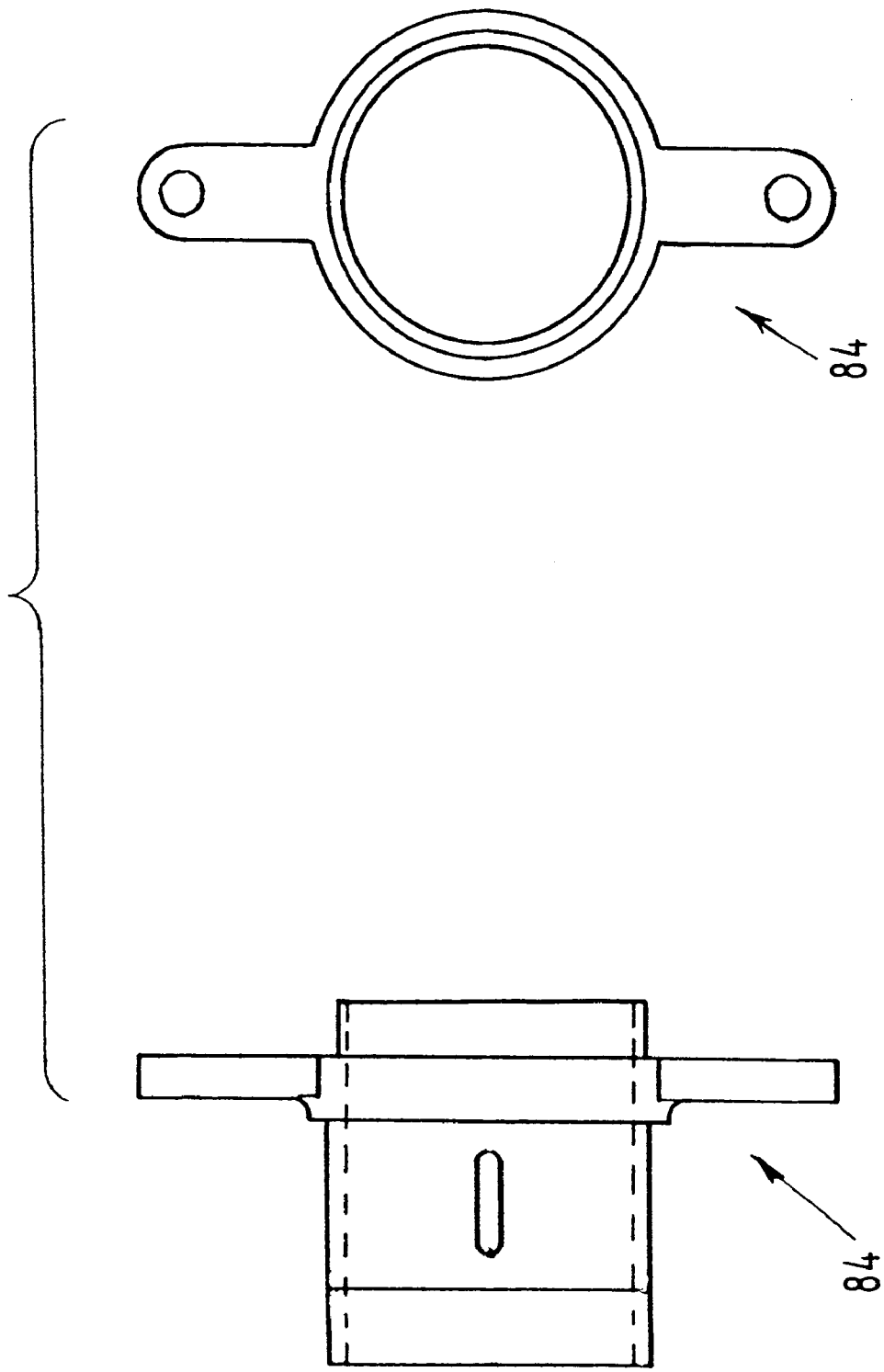
FIG. 5 shows two views of a bearing bush which forms part of the transmission shown in FIG. 1.

For adjustment of the eccentric position of wheel 8 are provided adjusting means 75 in which is received a rotatable eccentric 76. This rotatable eccentric 76 is also shown in detail in FIG. 3. Arranged in eccentric 76 is a groove 86 which co-acts with a protruding cam 87, which cam 87 is mounted on an adjusting pin 88. Through axial displacement of adjusting pin 88 the cam 87 will also displace and the eccentric will thus rotate, whereby the eccentric position of wheel 8 is changed. Adjusting pin 88 is movable in the hollow shaft 2 which is shown in FIG. 4. The bearing bush 84 on which wheel 8 is mounted is shown in detail in FIG. 5.

Figure 6:
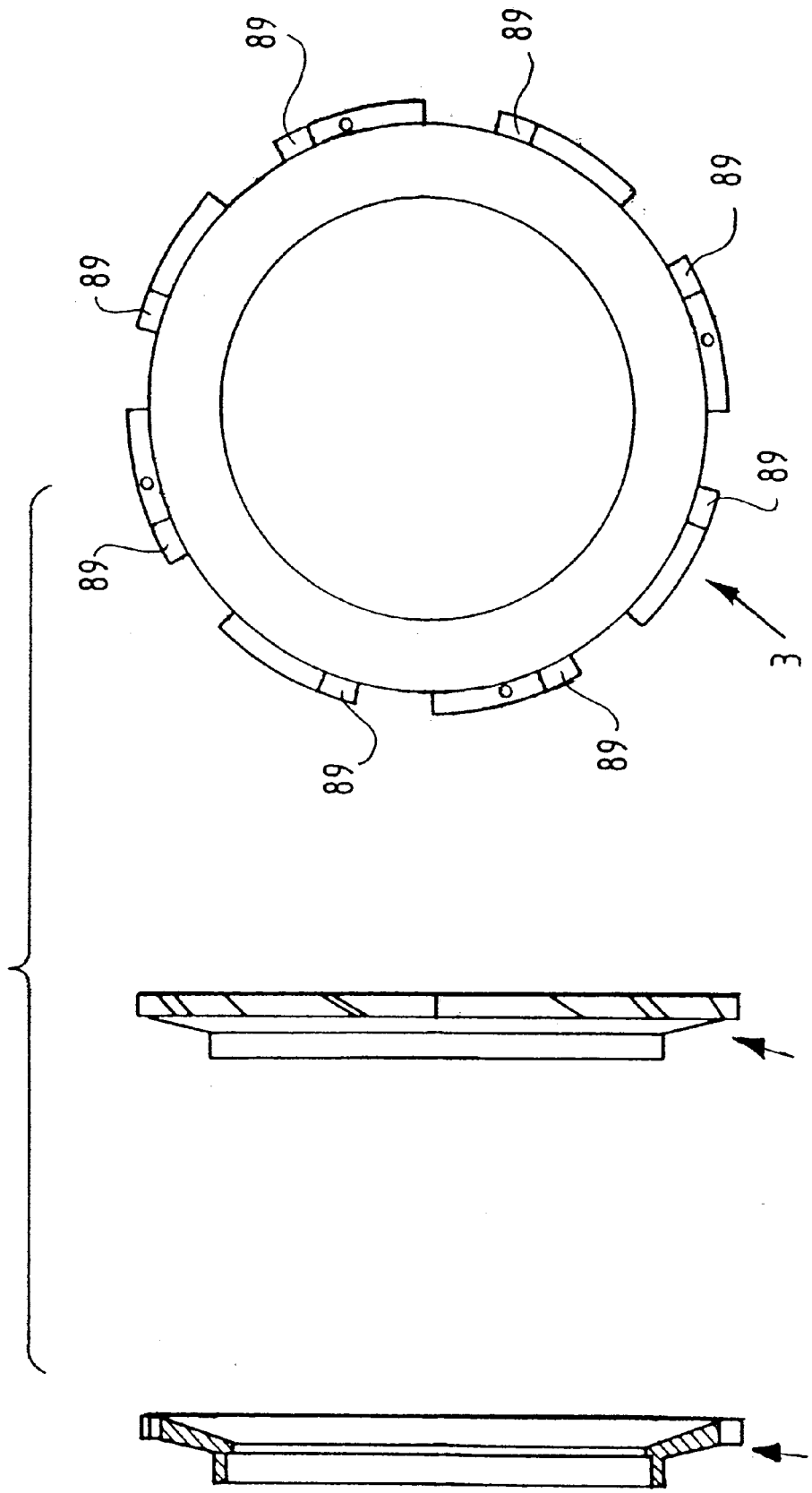
FIG. 6 shows three views of a friction wheel according the invention.
Figure 7:
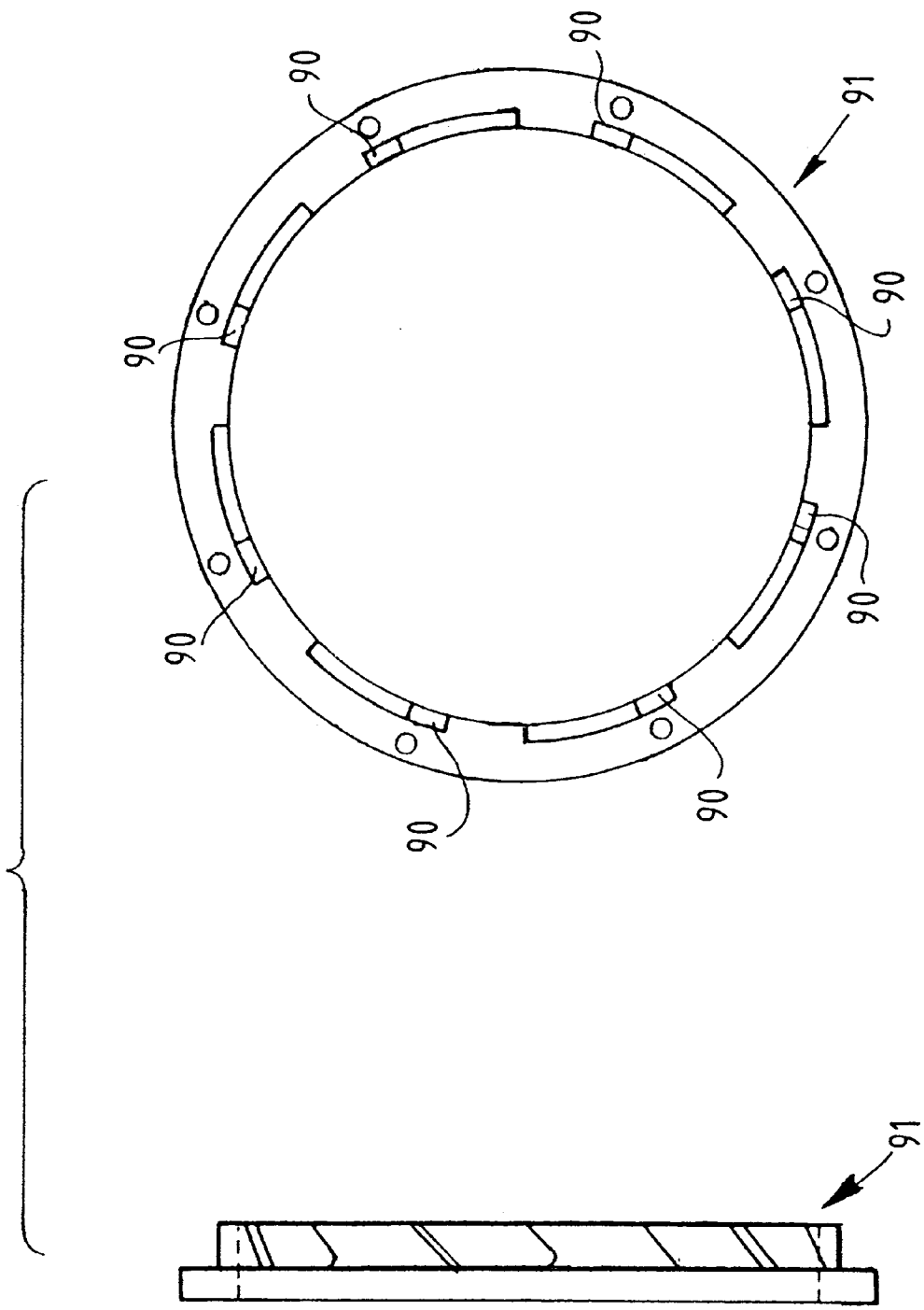
FIG. 7 shows two views of a nut for co-action with the friction wheel shown in FIG. 6.

FIG. 6 shows a friction wheel 3 in three different views, wherein on the axially external side of friction wheel 3 are shown contact surfaces 89 which co-act with contra-contact surfaces 90 forming part of a nut 91 as shown in FIG. 7. Nut 91 is placed on the side of friction wheel 3 remote from the other friction wheel 4 in order to support this friction wheel 3. The contra-contact surfaces 90 herein lie against the contact surfaces 89 of friction wheel 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Mechanical transmission comprising a frame, a first shaft which is rotatably connected to the frame and to which is coupled a pair of spaced apart friction wheels, a second shaft which is connected to the frame for rotation parallel to the first shaft and which carries a wheel which co-acts with an annular element comprising a circular contact surface located axially between the friction wheels of the first shaft, wherein the friction wheels comprise mutually converging friction surfaces, wherein the transmission comprises guides by which a rotational translating movement of the wheel which is connected to the second shaft is realized, which guides are assembled from at least two linear guide tracks received mutually perpendicularly in a plate and first and second guide elements co-acting with the linear guide tracks, and wherein the first guide elements are connected to the wheel for rotational translation and the second guide elements are rigidly connected to the frame whereby the plate is movable in linear manner relative to the frame and the wheel is displaceable in linear manner relative to the plate.

2. Mechanical transmission as claimed in claim 1, characterized in that the annular element consists of an endless belt of mutually abutting push links.

3. Mechanical transmission comprising a frame, a first shaft which is rotatably connected to the frame and to which is coupled a pair of spaced apart friction wheels, a second shaft which is connected to the frame for rotation parallel to the first shaft and which carries a wheel, positioned between said friction wheels, which co-acts with an annular element comprising a circular contact surface located axially between the friction wheels of the first shaft, wherein the friction wheels comprise mutually converging friction surfaces, wherein the transmission comprises adjusting means for adjusting an eccentricity of the wheel connected to the second shaft relative to the first shaft, which adjusting means are formed by a rotatable and fixable eccentric.

4. Mechanical transmission as claimed in claim 3 characterized in that the annular element consists of an endless belt of mutually abutting push links.

5. Mechanical transmission comprising a frame, a first shaft which is rotatable connected to the frame and to which is coupled a pair of spaced apart friction wheels, a second shaft which is connected to the frame for rotation parallel to the first shaft and which carries a wheel which co-acts with an annular element comprising a circular contact surface located axially between the friction wheels of the first shaft, wherein the friction wheels comprise mutually converging friction surfaces, wherein the friction wheels are supported externally by supports, which supports are provided with contact surfaces which co-act with contra-contact surfaces arranged close to the external edge of the friction wheels, and wherein the annular element consists of an endless belt of mutually abutting push links.

6. Mechanical transmission comprising a frame, a first shaft which is rotatable connected to the frame and to which is coupled a pair of spaced apart friction wheels, a second shaft which is connected to the frame for rotation parallel to the first shaft and which carries a wheel which co-acts with an annular element comprising a circular contact surface located axially between the friction wheels of the first shaft, wherein the friction wheels comprise mutually converging friction surfaces, wherein the friction wheels are supported externally by supports, which supports are provided with contact surfaces which co-act with contra-contact surfaces arranged close to the external edge of the friction wheels, and wherein the contact surfaces and the contra-contact surfaces form parts of a helix.

7. Mechanical transmission comprising a frame, a first shaft which is rotatably connected to the frame and to which is coupled a pair of spaced apart friction wheels, a second shaft which is connected to the frame for rotation parallel to the first shaft and which carries a wheel which co-acts with a flexible, deformable annular element comprising a circular contact surface located axially between the friction wheels of the first shaft, wherein the friction wheels comprise mutually converging friction surfaces which converge in a radially outward direction, and wherein the wheel makes contact with an internal surface of the annular element, whereby a radially inward facing surface forms a surface for co-action with the wheel.

8. Mechanical transmission comprising a frame, a first shaft which is rotatable connected to the frame and to which is coupled a pair of spaced apart friction wheels, a second shaft which is connected to the frame for rotation parallel to the first shaft and which carries a wheel which co-acts with an annular element comprising a circular contact surface located axially between the friction wheels of the first shaft, wherein the friction wheels comprise mutually converging friction surfaces, wherein the wheel makes contact with an internal surface of the annular element, whereby a radially inward facing surface forms a surface for co-action with the wheel, and wherein the annular element consists of an endless belt of mutually abutting push links.

* * * * *